United States Patent [19]

Lee

[11] 4,012,803
[45] Mar. 22, 1977

[54] MULTIHEADED RADIAL TYPE NUT TAPPER

[76] Inventor: Yuan Ho Lee, 85 Jen Ho Road, Tainan, China /Taiwan

[22] Filed: Dec. 29, 1975

[21] Appl. No.: 644,941

[52] U.S. Cl. .............................. 10/132; 10/129 WJ; 408/43

[51] Int. Cl.² ....................... B23G 1/08; B23G 1/20

[58] Field of Search ... 10/129 WH, 129 WJ, 130 R, 10/130 WH, 132, 139 WH, 139 WJ; 408/43, 48, 49

[56] References Cited

UNITED STATES PATENTS

| 52,415 | 2/1866 | Hubbard | 10/132 |
| 604,447 | 5/1898 | Weiss | 408/43 |
| 947,961 | 2/1910 | Boma | 10/130 WH |
| 1,254,709 | 1/1918 | Levinger et al. | 10/129 WJ |
| 2,714,213 | 8/1955 | Holzer | 408/43 |

FOREIGN PATENTS OR APPLICATIONS

| 124,285 | 4/1959 | U.S.S.R. | 10/130 |

*Primary Examiner*—C.W. Lanham
*Assistant Examiner*—E. M. Combs
*Attorney, Agent, or Firm*—Lane, Aitken, Dunner & Ziems

[57] ABSTRACT

A multiheaded radial type nut tapper having a plurality of push rods arranged in a radial fashion and driven by a cam arranged so that at each revolution of the cam, a number of finished products will be obtained.

5 Claims, 3 Drawing Figures

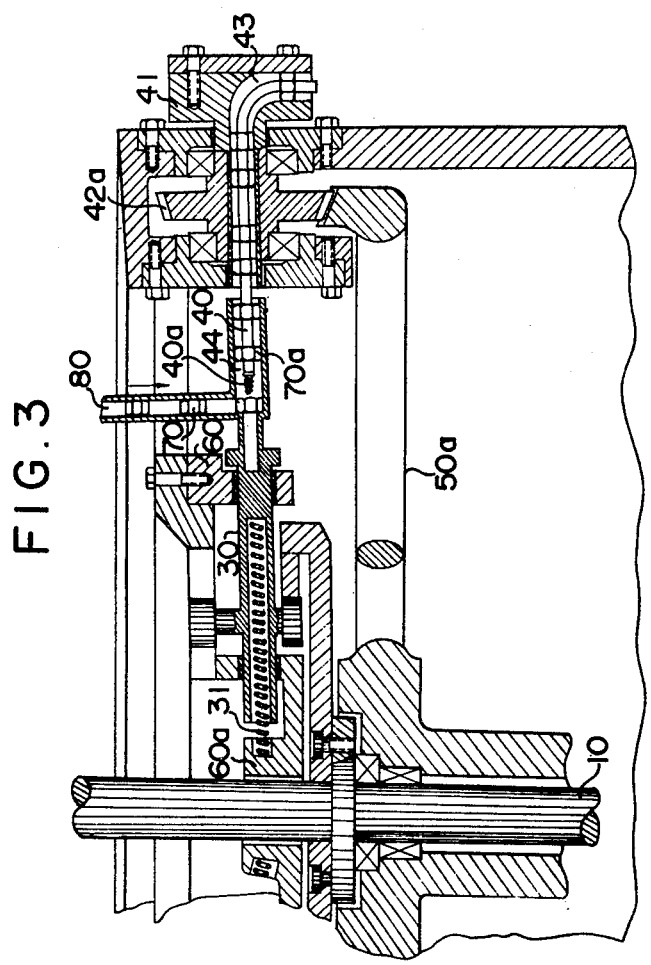

MULTIHEADED RADIAL TYPE NUT TAPPER

BACKGROUND OF THE INVENTION

In a conventional nut tapper, a cam is provided to drive one or two push rods to cause the push rods to push blank nuts into a guideway and further push them forward to receive a high speed spin-tapping for the purpose of providing the blank nut with a female thread. In such machines, the axis of the cam shaft and the axis of the push rod shaft are provided in a parallel arrangement making it infeasible for one cam to drive more than two separate push rods, thus limiting the rate of production.

The purpose of the present invention is to eliminate the defects mentioned above and to provide a nut tapper capable of greatly increased production and with the effectiveness that could only be achieved by a large number of conventional nut tappers.

BRIEF DESCRIPTION OF THE INVENTION

The invention comprises a multiheaded radial type nut tapper having a plurality of push rod means for feeding nut blanks to tapping means, all disposed in a radial fashion about a cam which operates the push rods. By appropriate gearing, the tapping means are made to rotate by the rotation of a central drive shaft on which the cam is mounted. The tapping means comprise bent tapping means wherein a nut blank is tapped to become a finished nut and then expelled from the tapping means by unidirectional rotation of the tapping means. The machine presents a spatially efficient arrangement for the relatively large number of tapping heads, and the nut blank feeding means employed is capable of high speed feeding operation, resulting in a high production capacity machine.

The invention will now be explained with reference to the appended drawings, wherein:

FIG. 3 is another embodiment of a tapper according to the present invention.

Figure 1:
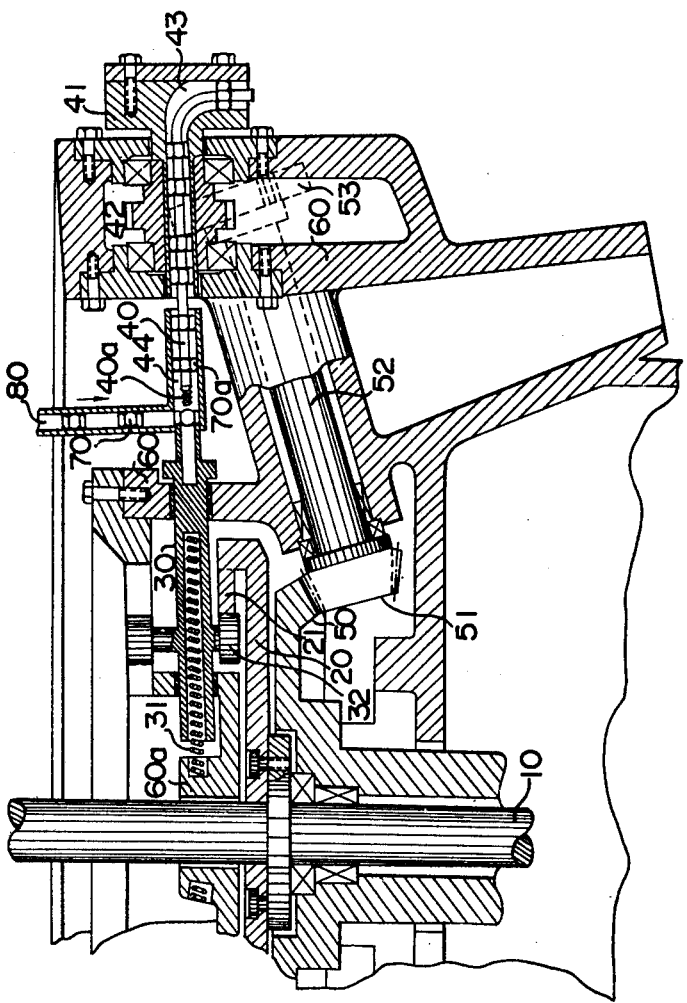
FIG. 1 is partial cut away of a nut tapper according to the present invention.
Figure 2:
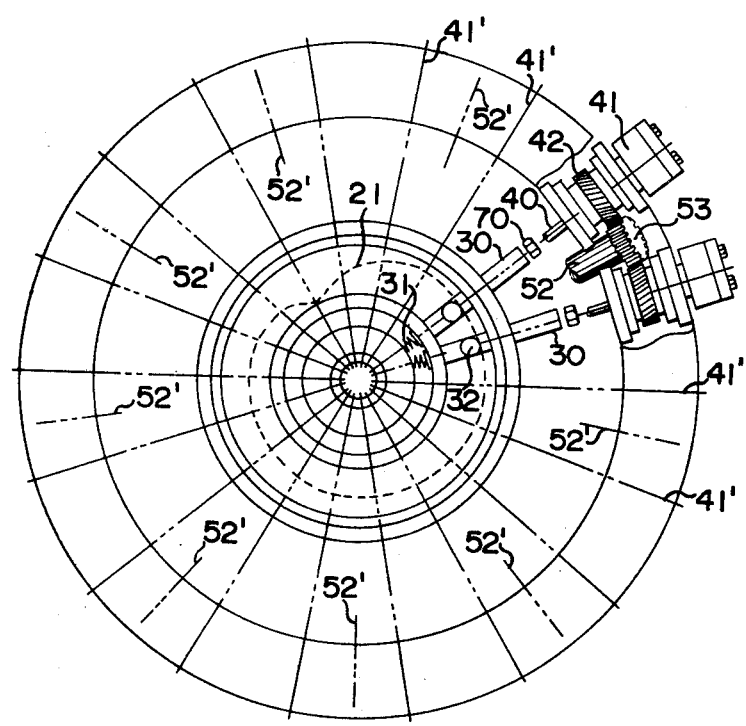
FIG. 2 is a top view of one set of push rods according to the present invention.

As shown in FIGS. 1 & 2, a plurality of push rods 30—30 each having its axis at a suitable angle to the axis of said cam 20, are provided on a cam 20 of a driving shaft 10. The push rods 30—30 are located in a radial fashion on the machine frame 60 and have provided at one end a spring 31 which in turn is secured to the frame body 60a. Each push rod 30 is further provided with a roller 32 which by virtue of the force of the spring 31 follows the inner surface of the flange 21 of a cam 20 so that when the cam 20 is driven rotationally by a driving shaft 10, the push rod will push out as the spring 31 pushes the rod 30 outwardly with the roller 32 following along the face of the flange 21. A blank nut 70 is thereby pushed through the tapping guide way 44. As the cam 20 continues to rotate, the push rod will be returned to its original position by virtue of the same roller 32 and the flange 21. A tap driving shaft 41 is provided opposite every push rod 30. The tap driving shafts are pivotedly secured to frame body 60 and arranged in a radial manner so that each tap driving shaft 41 is coaxial with a corresponding push rod 30 thereof. Each tap driving shaft 41 also has provided thereon a helical gear 42 or any other suitable gear such as a hypoid gear or the like. The helical gears of every set of two tap driving shafts are commonly meshed with one driving gear 53. The gear 53 is situated at a proper position between the two tap driving shafts 41—41. Each driving gear 53 is provided at one end of a rotary shaft 52, the shaft being provided at the other end thereof with a bevel gear 51. Each bevel gear 51 meshes with a large bevel gear 50. The large bevel gear 50 rotates at a suitable speed in relation to the speed at which the drive shaft 10 rotates, driving simultaneously the plurality of rotary shafts 52—52, thereby driving the tap driving shafts 41—41 in a rotary motion.

Each individual tap driving shaft 41 is provided internally with a shaft tunnel 43 of a suitable configuration for accomodating a bent tap 40 so that when the tap driving shaft 41 is driven in the above-described rotary motion, the bent tap 40 will be driven in the same motion. The push rod 30 advances the blank nut 70 through the guide way 44. After passing the tapping head 40a and undergoing highspeed spin-tapping thereby, the blank nut 70 becomes a finished product 70a and is ejected from the machine at the end of the shaft tunnel 43 of tap driving shaft 41.

According to the present embodiment of the invention there are in all eighteen separate push rods 30—30 arranged in a radial manner and opposite each push rod is provided a corresponding bent tap 40 which in turn is provided in a tap driving shaft 41. The tap and shaft are provided on the same axis as the push rod 30, so that when a blank nut 70 is fed through a slide way 80 to a position in front of the push rod 30, the push rod will push the blank nut 70 through the guide way 44 and past the rotating tapping head 40a by virtue of the force of the spring 31 against the push rod, causing the push rod to follow the flange 21 of cam 20. As the blank 70 is pushed past the tapping head 40a, a female thread will be cut along the interior surface thereof by virtue of the high speed rotation of the tapping head 40a, producing thereby a finished product 70a. The push rod 30 will then be returned to its original position by virtue of the cam 20, the flange 21 of which has now rotated to the place of smaller diameter and serves to push the roller 32 back toward the original position whereupon the next blank nut 70 to be processed is immediately introduced from the slide way 80 to the front of the push rod 30 in order to be pushed by said push rod over and past the tapping head 40a in the above described operation. It will be understood that in the present embodiment, there are a total of eighteen tap driving shafts arranged radially, at positions 41'—41' each being provided with a bent tap having a tapping head provided at the front-most portion thereof. The eighteen tap driving shafts are driven in sets of two by nine rotary shafts 52—52, one rotary shaft to every set of two tap driving shafts, which are located at positions 52'—52'. Eighteen separate push rods are provided in a radial manner being driven by a single cam so that as the cam revolves, the push rods will accomplish the feeding operation in very close synchronization, meaning that a single tapping machine constructed in accordance with the present invention will surpass the effectiveness of a number of conventional machines as only one operator is required and more nuts can be tapped at less cost.

As shown in FIG. 3, a second embodiment of a nut tapper according to the present invention, the various tap driving shafts 40—40 are driven directly by a large bevel gear 50a which is driven by the driving shaft 10 and is meshed with bevel gears 42a provided on the tap driving shafts 40—40. All other aspects of this embodiment are identical to the first embodiment described in detail above.

What I claim is:

1. A multiheaded radial type nut tapper comprising:
a driving shaft adapted to be driven in rotary motion;
a cam provided on said driving shaft;
a plurality of push rods disposed radially about said cam and adapted to be driven by said cam in reciprocating motion thereby;
means for feeding nut blanks to a position in front of each of said push rods;
a plurality of tap driving shafts disposed radially about the driving shaft, each having its respective rotational axis aligned with an axis of one of said push rods; and
a plurality of bent taps adapted for rotation with said tap driving shafts, one bent tap being provided within each tap driving shaft so that tapped nuts may be produced from nut blanks successively fed onto said bent taps by said push rods as said drive shaft and said tap driving shafts are rotated.

2. A multiheaded radial type nut tapper according to claim 1 wherein said bent taps include tapping heads and said means for feeding nut blanks to a position in front of each push rod include slideways and comprising means defining tapping guide ways positioned between each push rod and the associated tap driving shaft and adapted to have the tapping head of the associated bent tap positioned therein.

3. A multiheaded radial type nut tapper according to claim 1 comprising means for rotating said tap driving shafts.

4. A multiheaded radial type nut tapper according to claim 3 wherein said means for rotating said tap driving shafts comprises:
gear means provided on said driving shaft;
gear means provided on said tap driving shafts; and
a plurality of rotary shaft means having gear means provided on each end thereof and positioned to mesh with said gear means on said driving shaft and said gear means on said tap driving shafts so that said tap driving shafts may be rotated as a result of rotation of said driving shaft.

5. A multiheaded radial type nut tapper according to claim 3 wherein said means for rotating said tap driving shafts comprises:
gear means provided on said tap driving shafts; and
bevel gear means supported on said driving shaft and meshed with said gear means provided on said tap driving shafts so that said tap driving shafts may be rotated as a result of rotation of said driving shaft.

* * * * *